US011964695B2

(12) United States Patent
Nilsson et al.

(10) Patent No.: US 11,964,695 B2
(45) Date of Patent: Apr. 23, 2024

(54) VEHICLE AND A METHOD OF SIMULATING A DRIFTING/SKIDDING MOVEMENT OF A VEHICLE

(71) Applicant: Ningbo Geely Automobile Research & Development Co., Ltd., Ningbo (CN)

(72) Inventors: Magnus Nilsson, Floda (SE); Erik Lindberg Nilsson, Gothenburg (SE)

(73) Assignee: Ningbo Geely Automobile Research &Dev. Co., Ltd., Ningbo (CN)

( * ) Notice: Subject to any disclaimer, the term of this patent is extended or adjusted under 35 U.S.C. 154(b) by 312 days.

(21) Appl. No.: 17/480,522

(22) Filed: Sep. 21, 2021

(65) Prior Publication Data

US 2022/0001930 A1 Jan. 6, 2022

Related U.S. Application Data

(63) Continuation of application No. PCT/CN2020/079979, filed on Mar. 18, 2020.

(30) Foreign Application Priority Data

Mar. 29, 2019 (EP) .................................... 19166210

(51) Int. Cl.
B62D 24/00 (2006.01)
(52) U.S. Cl.
CPC .................................. B62D 24/00 (2013.01)
(58) Field of Classification Search
None
See application file for complete search history.

(56) References Cited

U.S. PATENT DOCUMENTS

| | | | | |
|---|---|---|---|---|
| 5,979,827 A * | 11/1999 | Corcoran | ............... | B64D 11/00 244/122 AG |
| 6,398,293 B1 * | 6/2002 | Nystrom | ............ | B62D 33/0604 296/190.04 |
| 6,755,270 B2 * | 6/2004 | Saarinen | .................. | B60N 2/39 296/190.04 |
| 7,258,181 B2 * | 8/2007 | Hammonds | ............ | B62D 53/00 280/433 |
| 7,600,596 B2 * | 10/2009 | Van Den Brink | ....... | B62K 5/10 180/41 |
| 7,694,758 B1 * | 4/2010 | Hammonds | ............ | B62D 11/06 180/6.48 |

(Continued)

FOREIGN PATENT DOCUMENTS

| CN | 104992585 A | 10/2015 |
|---|---|---|
| CN | 105818811 A | 8/2016 |

(Continued)

OTHER PUBLICATIONS

International Search Report from corresponding International Application No. PCT/CN2020/079979, dated Jun. 24, 2020, 2 pages.

*Primary Examiner* — Jonathan M Dager
(74) *Attorney, Agent, or Firm* — Tucker Ellis LLP

(57) ABSTRACT

A vehicle includes a user compartment and a driving platform, wherein the driving platform is arranged to be in contact with a road/ground, wherein the user compartment is movably connected to the driving platform in a way that it may pivot around a vertical axis of the vehicle. The vehicle may be used in a method of simulating a drifting/skidding movement of the vehicle.

13 Claims, 2 Drawing Sheets

(56) References Cited

U.S. PATENT DOCUMENTS

| | | | | |
|---|---|---|---|---|
| 7,946,371 B1* | 5/2011 | Cichon | | B62M 27/02 |
| | | | | 180/41 |
| 8,655,554 B2* | 2/2014 | Lin | | B60N 2/10 |
| | | | | 296/65.01 |
| 8,967,939 B2* | 3/2015 | Hammonds | | B64F 1/227 |
| | | | | 244/50 |
| 9,428,236 B2* | 8/2016 | Goss | | B62K 11/00 |
| 9,616,922 B2* | 4/2017 | Suzuki | | B60L 15/2036 |
| 9,815,388 B1* | 11/2017 | Lindsay | | B60N 2/06 |
| 10,029,586 B2* | 7/2018 | Hein | | B60N 2/0244 |
| 10,632,867 B2* | 4/2020 | Kim | | B60K 35/00 |
| 10,723,381 B2* | 7/2020 | Thompson | | B60G 3/14 |
| 10,926,600 B2* | 2/2021 | Frasher | | B60G 17/018 |
| 10,967,929 B2* | 4/2021 | Brudeli | | B62K 5/027 |
| 11,685,303 B2* | 6/2023 | Currier | | B60P 3/38 |
| | | | | 296/190.02 |
| 2003/0127272 A1* | 7/2003 | Baker | | B60N 2/90 |
| | | | | 180/326 |
| 2007/0276568 A1* | 11/2007 | Tozu | | B60N 2/14 |
| | | | | 297/217.3 |
| 2009/0038862 A1* | 2/2009 | Hammonds | | B62D 11/04 |
| | | | | 180/6.48 |
| 2009/0164073 A1* | 6/2009 | Mabuchi | | B60N 2/02246 |
| | | | | 296/65.18 |
| 2011/0067941 A1 | 3/2011 | Belzile | | |
| 2011/0307129 A1 | 12/2011 | Yu | | |
| 2013/0006478 A1* | 1/2013 | Lin | | B60N 2/10 |
| | | | | 701/49 |
| 2013/0131923 A1* | 5/2013 | Tzipman | | B62D 1/02 |
| | | | | 280/124.103 |
| 2015/0123389 A1* | 5/2015 | Goss | | B62K 11/00 |
| | | | | 280/755 |
| 2015/0274160 A1* | 10/2015 | Lee | | B62D 6/002 |
| | | | | 180/215 |
| 2017/0021889 A1* | 1/2017 | Frohnmayer | | B62K 5/05 |
| 2018/0015954 A1* | 1/2018 | Casgrain | | B62D 24/04 |
| 2018/0057050 A1* | 3/2018 | Takenaka | | B60G 17/0162 |
| 2018/0236875 A1 | 8/2018 | Sugai | | |
| 2018/0237065 A1* | 8/2018 | Yamamoto | | B60G 21/007 |
| 2019/0092386 A1 | 3/2019 | Wu | | |
| 2019/0105959 A1* | 4/2019 | Knisley | | B62D 9/02 |
| 2019/0184867 A1* | 6/2019 | Ketels | | B60N 2/525 |
| 2020/0289949 A1* | 9/2020 | Tresaugue | | A63G 9/16 |
| 2020/0317017 A1* | 10/2020 | Nobutoki | | B62D 24/00 |
| 2021/0114553 A1* | 4/2021 | Awtar | | G06N 20/00 |
| 2022/0355884 A1* | 11/2022 | Inkirev | | B60G 15/067 |
| 2023/0009457 A1* | 1/2023 | Parr | | B61L 25/025 |

FOREIGN PATENT DOCUMENTS

| | | | | |
|---|---|---|---|---|
| CN | 106023713 A | | 10/2016 | |
| CN | 107000742 A | | 8/2017 | |
| CN | 108569277 A | | 9/2018 | |
| EP | 3584143 A1 | * | 12/2019 | ......... B60G 17/0162 |
| JP | H08282521 A | | 10/1996 | |
| JP | 2019500256 A | | 1/2019 | |
| WO | 2007022525 A2 | | 2/2007 | |

* cited by examiner

VEHICLE AND A METHOD OF SIMULATING A DRIFTING/SKIDDING MOVEMENT OF A VEHICLE

RELATED APPLICATION DATA

This application is a continuation of International Patent Application No. PCT/CN2020/079979, filed Mar. 18, 2020, which claims the benefit of European Patent Application No. 19166210.5, filed Mar. 29, 2019, the disclosures of which are incorporated herein by reference in their entireties.

TECHNICAL FIELD

The present invention relates to a vehicle and a method of simulating a drifting/skidding movement of a vehicle. More specifically, the disclosure relates to a vehicle and a method of simulating a drifting/skidding movement of a vehicle as defined in the introductory parts of claim 1 and claim 12.

BACKGROUND

Cars and other road vehicles for transporting people and goods have been around for over a hundred years. The sole purpose of such road vehicles has been to transport humans or goods from one place to another. For a very long time different models have been available, e.g. with different engine sizes and looks, wherein the differences have not been directly connected to the sole purpose of transportation from one point to another. Some users want a vehicle with a large engine that accelerates quickly and some users want a vehicle with good aerodynamics to make it faster. Different needs and desires have driven the market to produce a vast amount of different road vehicles.

Fast cars have for a long time been popular as many people find it amusing to drive fast. Competitions where the fastest driver to complete a distance or track has thereby since long been popular. When driving fast through a sharp turn, the fastest way to complete the turn is to let the car drift or skid, i.e. at least the back wheels of the vehicle is purposely let to lose their grip on the road/ground. This is something professional dirt road race drivers do in almost every turn, which naturally inspires normal and more average vehicle users. In normal traffic it is, however, dangerous to drift/skid and non-professional drivers would risk both their own vehicle and life and the lives of others using the roads or being close by.

There is thus a need for a vehicle that fulfills the needs and desires of the vehicle user that is safe to use on normal roads, in normal traffic and by non-professional vehicle drivers.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object to mitigate, alleviate or eliminate one or more of the above-identified deficiencies in the art and disadvantages singly or in any combination and solve at least the above mentioned problem. According to a first aspect of the invention there is provided a vehicle comprising a user compartment and a driving platform, wherein the driving platform is arranged to be in contact with a road/ground, wherein the user compartment is movably connected to the driving platform in a way that it may pivot around a vertical axis of the vehicle.

A movable user compartment can be used to enhance the user's experience of riding the car as it unlocks a new dimension for movement while the car is driven. It may also enhance the visibility for the user in some viewing directions. The user may be the driver of the car or a passenger of the car. The user is further placed in the user compartment of the vehicle.

According to an aspect the vehicle comprises a motor connected to the user compartment, wherein the motor is arranged to pivot the user compartment around the vertical axis of the vehicle. The motor thus makes it possible to adjust the position of the user compartment in which the user is situated.

According to an aspect the vehicle comprises a control unit connected to the motor and arranged to control the motor to pivot the user compartment around the vertical axis of the vehicle so as to accurately rotate the user compartment in the direction determined at that point in time. The control unit is e.g. a computer with a memory that may have predetermined positions set for the rotational position of the user compartment.

According to an aspect the vehicle comprises at least one sensor, which is adapted to detect when the vehicle is turning, wherein the at least one sensor is connected to the control unit, and wherein the control unit is arranged to control the motor to pivot the user compartment around the vertical axis of the vehicle at least based on input from the one or more sensors. The control unit can then rotate the user compartment around the vertical axis based on driving patterns detected by the sensor.

According to an aspect the one or more sensors is a gyro-sensor or a g-force sensor, or a wheel-angle detection sensor. The control unit then receives information about the movement and/or turns of the vehicle and may rotate the user compartment based on that information.

According to an aspect the vehicle comprises a GPS-system connected to the control unit, wherein the control unit is arranged to control the motor to pivot the user compartment around the vertical axis of the vehicle at least based on input from the GPS-system. The position data from the GPS-system may be used for detecting car movement and rotate the user compartment based on the movement, but it may also be used to disable rotation of the user compartment in certain predetermined geographical zones.

According to an aspect the vehicle is connected to a cloud service, wherein the control unit is arranged to control the motor to pivot the user compartment around the vertical axis of the vehicle at least based on input received from the cloud service. Enhanced intelligence may be provided by the cloud service, e.g. for disabling rotation of the user compartment based on information not otherwise available for the control unit, such as e.g. traffic information, weather information etc.

According to an aspect the control unit is arranged to control the pivot of the user compartment around the vertical axis of the vehicle to simulate a skidding/drifting movement of the vehicle. Skidding/drifting may thus be virtually performed/simulated in places where it would be dangerous to do real skidding/drifting.

According to an aspect the control unit is arranged to control the pivot of the user compartment around the vertical axis of the vehicle to simulate a skidding/drifting movement of the vehicle at a turn that the vehicle is turning. The control unit thus uses the sensors to detect the turn of the driving platform and controls the motor to turn the user compartments so as to simulate skidding/drifting around the turn the driving platform is actively taking at the moment.

According to an aspect the control unit is arranged to control the pivot of the user compartment around the vertical axis of the vehicle to point more inwards in a turn than the driving platform following the turn, so as to simulate skidding/drifting to a point close to losing control if it was a real skidding/drifting action.

According to an aspect the control unit is arranged to control the pivot of the user compartment around the vertical axis of the vehicle continuously during a turn so as to simulate a gradually skidding/drifting, e.g. in relation to the rotational angle of the wheels. In case the car has a steering wheel, the rotational angle of the user compartment may be related to the turning of the steering wheel.

According to a second aspect of the invention there is provided a method of simulating a drifting/skidding movement of a vehicle according to the first aspect, comprising the steps of: pivoting the user compartment in relation to the driving platform around the vertical axis of the vehicle when the vehicle is turning.

According to an aspect the method comprising the step of: receiving, in a control unit, input of that the vehicle is turning, and controlling the pivoting of the user compartment in relation to the driving platform around the vertical axis of the vehicle in response to the input.

According to an aspect the method involves the vehicle as described above, wherein the method comprises the step of controlling the motor, by the control unit, to pivot the user compartment around the vertical axis of the vehicle.

According to an aspect the method involves the vehicle as described above, wherein the method comprises the step of receiving input from one or more sensors of the vehicle, a GPS-system and/or a cloud service.

According to an aspect the step of controlling the pivot of the user compartment around the vertical axis of the vehicle to simulates a drifting/skidding movement of the vehicle, even if the vehicle is not.

According to an aspect the step of controlling the pivot of the user compartment around the vertical axis of the vehicle to points more inwards in a turn than the driving platform following the turn.

Effects and features of the second aspect are to a large extent analogous to those described above in connection with the first aspect. Embodiments mentioned in relation to the first aspect are largely compatible with the second aspect. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments and aspects of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting.

BRIEF DESCRIPTION OF THE DRAWINGS

The invention will by way of example be described in more detail with reference to the appended drawings, showing presently preferred embodiments and aspects of the invention.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments and aspects of the present disclosure will be described and exemplified more fully hereinafter with reference to the accompanying drawings. The solutions disclosed herein can, however, be realized in many different forms and should not be construed as being limited to the embodiments set forth herein.

Figure 1:
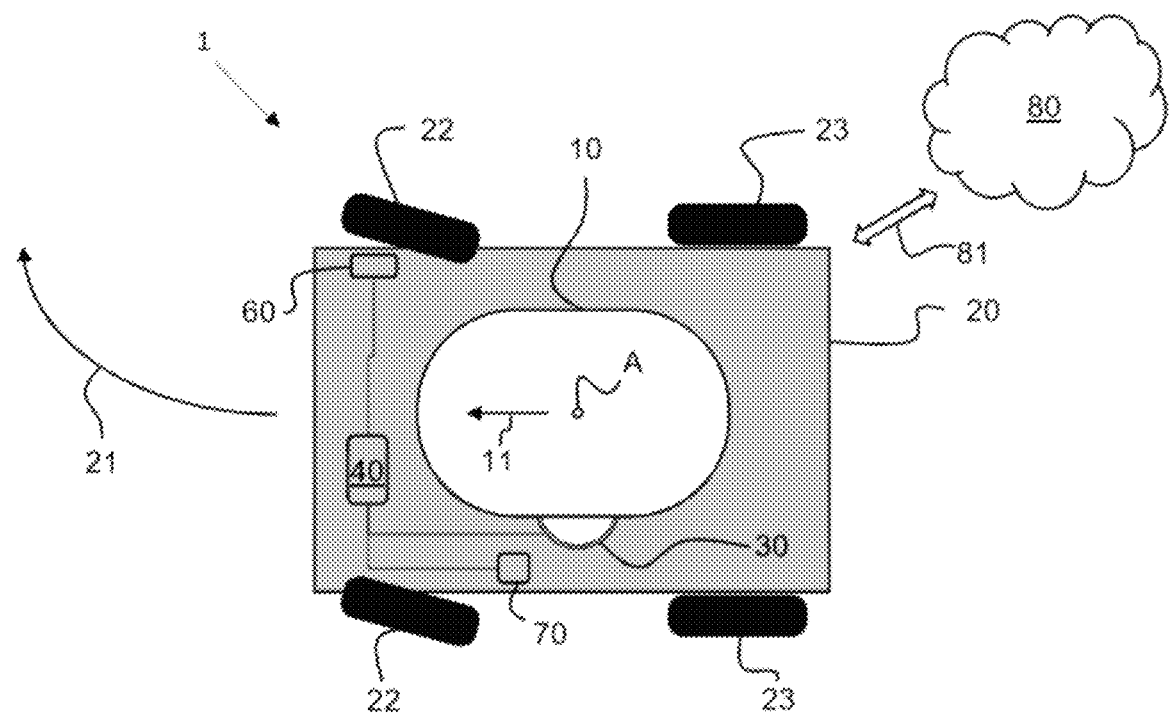
FIG. 1 shows a schematic top view of a vehicle according to the invention with a rotatable user compartment, wherein the vehicle is driving in a mode as a normal vehicle.
Figure 2:
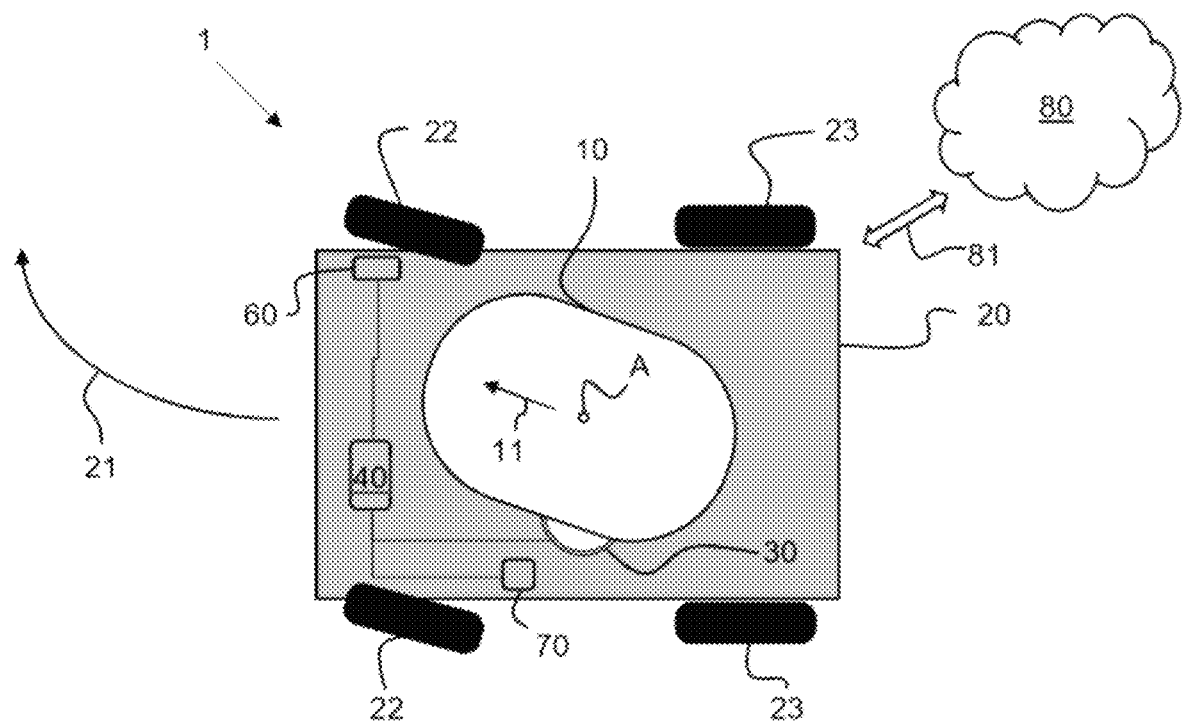
FIG. 2 shows a schematic top view of a vehicle according to the invention, wherein the user compartment is pivoted to simulate skidding/drifting as the vehicle turns to the right.

The invention will now be described with reference to FIG. 1 and FIG. 2. This disclosure shows a vehicle 1. The vehicle 1 comprising a user compartment 10 and a driving platform 20. The driving platform 20 is arranged to be in contact with a road/ground. The user compartment 10 is movably connected to the driving platform 20 in a way that it may pivot around a vertical axis A of the vehicle 1. According to an aspect the driving platform could pivot 0-90° to the right and 0-90° to the left. According to an aspect the driving platform could pivot 0-70° to the right and 0-70° to the left. According to an aspect the driving platform could pivot 0-45° to the right and 0-45° to the left. The driving platform 20 has two front wheels 22 and two rear wheels 23. The direction of the user compartment 10 is indicated by the user compartment directional arrow 11. In FIG. 1 the user compartments directional arrow 11 indicate that the user compartment 10 is directed in the same direction as the driving platform 20. In FIG. 2 the user compartments directional arrow 11 indicate that the user compartment 10 is directed in to the right in line with the direction of the wheels 22 turning the driving platform along the driving platform directional arrow 21.

The vehicle 1 further comprises a motor 30 connected to the user compartment 10. The motor 30 is arranged to pivot the user compartment 10 around the vertical axis A of the vehicle 1. The vehicle 1 further comprises a control unit 40 connected to the motor 30. The control unit 40 is arranged to control the motor 30 to pivot the user compartment 10 around the vertical axis A of the vehicle 1. The vehicle 1 comprises at least one sensor 60. The at least one sensor 60 is adapted to detect when the vehicle is turning. The at least one sensor 60 is according to an aspect connected to the control unit 40 by a wire. The control unit 40 is connected to and arranged to control the motor 30 to pivot the user compartment 10 around the vertical axis A of the vehicle 1. The pivot of the user compartment around the axis A is based on input from the one or more sensors 60. The one or more sensors 60 is a gyro-sensor or a g-force sensor, or a wheel-angle detection sensor.

According to an aspect a mobile device of the user can also be connected to the vehicle's control unit 40 to make use of any sensors as further gyroscopes, etc. available, e.g. in a smart phone. The control unit 40 may also have a user interface that can be accessed via a display (not shown) in the user compartment or via a mobile device connected to the vehicle as e.g. a smart phone or a tablet computer.

The vehicle 1 further comprises a GPS-system 70 connected to the control unit 40. The control unit 40 is arranged to control the motor 30 to pivot the user compartment 10 around the vertical axis A of the vehicle 1 at least based on input from the GPS-system 70 According to an aspect the input from the GPS-system could be the vehicle's position on the road and an angle of a turn on the road.

The vehicle 1 is according to an aspect connected to a cloud service 80. The control unit 40 is arranged to control the motor 30 to pivot the user compartment 10 around the vertical axis A of the vehicle 1 at least based on input received from the cloud service 80. The cloud service may be run by a company associated with the vehicle 1 to present the user with options and remote control the rotation/pivoting of the user compartment 10 so as to optimize the user experience. The cloud service 80 could according to an aspect remotely deactivate rotation of the user compartment, e.g. as an answer to government instructions, detected traffic situations or other situations where rotation of the user compartment is deemed not suitable.

The control unit 40 is arranged to control the pivot of the user compartment 10 around the vertical axis A of the vehicle 1 to simulate a skidding/drifting movement of the vehicle 1. The control unit 40 may in one user mode control the pivot of the user compartment 10 around the vertical axis A of the vehicle 1 to simulate a skidding/drifting movement of the vehicle 1 at a turn that the vehicle 1 is turning. In a further user mode the control unit 40 is arranged to control the pivot of the user compartment 10 around the vertical axis A of the vehicle 1 to point more inwards in a turn than the driving platform 20 following the turn as indicated by the driving platform directional arrow 21. In one embodiment the control unit 40 is arranged to control the pivot of the user compartment 10 around the vertical axis A of the vehicle 1 continuously during a turn so that the amount of simulated skidding/drifting is equivalent to the degree of turning.

Figure 3:
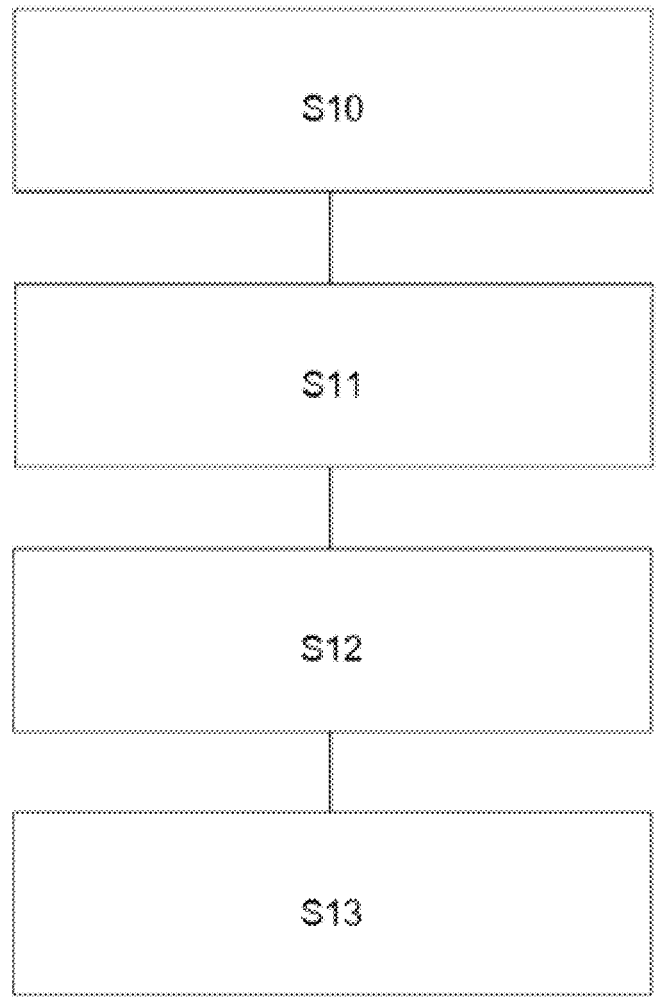
FIG. 3 shows a flow chart of the method according to the invention.

According to the second aspect of this disclosure shows a method of simulating a drifting/skidding movement of a vehicle according to the first aspect. With reference to FIG. 3 the method comprising the steps of: pivoting S10 the user compartment 10 in relation to the driving platform 20 around the vertical axis A of the vehicle 1 when the vehicle 1 is turning. The turn of the vehicle driving platform 20 is indicated in FIG. 1 by the driving platform directional arrow 21. The method further comprises receiving S11, in a control unit 40, input of that the vehicle 1 is turning, and controlling S12 the pivoting S10 of the user compartment 10 in relation to the driving platform 20 around the vertical axis A of the vehicle 1 in response to the input. According to an aspect, the method further comprises the step of controlling S13 the motor 30, by the control unit 40, to pivot the user compartment 10 around the vertical axis A of the vehicle 1. The method according to an aspect comprises the step of receiving S11 input from one or more sensors 60 of the vehicle 1, a GPS-system 70 and/or a cloud service 80.

According to an aspect the method comprises the step of controlling S13 the pivot of the user compartment 10 around the vertical axis A of the vehicle 1 to simulate a drifting/skidding movement of the vehicle 1, even if the vehicle 1 is not. Thus a drifting experience is effectively simulated. The user compartment 10 is as described decoupled from the driving platform 20 and the link between the compartment and the platform is motorized. The control unit 40 is configured to arbitrarily change the pointing angle of the user compartment 10. When a user enables a "Drift Mode", any time the driving platform 20 initiates a turn, the user compartment will be turned so that it points inwards, simulating that the vehicle is drifting through the turn. The compartment angle will be changed continuously so that when the vehicle exits the turn it is straight again. Sounds effects from wheels skidding may be played in the compartment to enhance the experience but also to make the user aware that the "Drift Mode" is enabled.

The method according to an aspect comprises the step of controlling S13 the pivot of the user compartment 10 around the vertical axis A of the vehicle 1 to point more inwards in a turn than the driving platform 20 following the turn.

The person skilled in the art realizes that the present invention by no means is limited to the preferred embodiments or aspect described above. On the contrary, many modifications and variations are possible within the scope of the appended claims. For example, in FIG. 1 and FIG. 2 it is indicated that the sensor or sensors 60 and the GPS-system 70 are connected to the control unit 40 by wires, but a person skilled realize that the connection could just as well be wireless. The vehicle could be any vehicle used on roads, from personal cars to trucks. Additionally, variations to the disclosed embodiments can be understood and effected by the skilled person in practicing the claimed invention, from a study of the drawings, the disclosure, and the appended claims.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments and aspect, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments and aspects disclosed herein may be applied to any other embodiment or aspect, wherever suitable. Likewise, any advantage of any of the embodiments or aspect may apply to any other embodiments or aspects, and vice versa.

Hence, it should be understood that the details of the described embodiments and aspects are merely examples brought forward for illustrative purposes, and that all variations that fall within the scope of the claims are intended to be embraced therein.

What is claimed is:

1. A vehicle comprising a user compartment and a driving platform, wherein the driving platform is arranged to be in contact with a road, wherein the user compartment is movably connected to the driving platform in a way that the user compartment pivots around a vertical axis of the vehicle;
   wherein the vehicle comprises a motor connected to the user compartment, wherein the motor is arranged to pivot the user compartment around the vertical axis of the vehicle;
   wherein the vehicle further comprises a control unit connected to the motor and arranged to control the motor to pivot the user compartment around the vertical axis of the vehicle; and
   wherein the control unit is arranged to control the pivot of the user compartment around the vertical axis of the vehicle to point more inwards in a turn than the driving platform following the turn.

2. The vehicle according to claim 1, wherein the vehicle comprises at least one sensor, which is adapted to detect when the vehicle is turning, wherein the at least one sensor is connected to the control unit, wherein the control unit is arranged to control the motor to pivot the user compartment around the vertical axis of the vehicle at least based on input from the one or more sensors.

3. The vehicle according to claim 2, wherein the one or more sensors is a gyro-sensor or a g-force sensor.

4. The vehicle according to claim 1, wherein the vehicle comprises a GPS-system connected to the control unit, wherein the control unit is arranged to control the motor to pivot the user compartment around the vertical axis of the vehicle at least based on input from the GPS-system.

5. The vehicle according to claim 1, wherein the vehicle is connected to a cloud service, wherein the control unit is arranged to control the motor to pivot the user compartment around the vertical axis of the vehicle at least based on input received from the cloud service.

6. The vehicle according to claim 1, wherein the control unit is arranged to control the pivot of the user compartment around the vertical axis of the vehicle to simulate a skidding or a drifting movement of the vehicle.

7. The vehicle according to claim 1, wherein the control unit is arranged to control the pivot of the user compartment around the vertical axis of the vehicle to simulate a skidding or a drifting movement of the vehicle in the turn that the vehicle is turning.

8. The vehicle according to claim 1, wherein the control unit is arranged to control the pivot of the user compartment around the vertical axis of the vehicle continuously during the turn.

9. A method of simulating a drifting or a skidding movement of a vehicle, wherein the vehicle includes a user compartment and a driving platform, wherein the driving platform is arranged to be in contact with a road, wherein the user compartment is movably connected to the driving platform in a way that the user compartment pivots around a vertical axis of the vehicle, wherein the vehicle comprises a motor connected to the user compartment, wherein the motor is arranged to pivot the user compartment around the vertical axis of the vehicle, wherein the vehicle further includes a control unit connected to the motor and arranged to control the motor to pivot the user compartment around the vertical axis of the vehicle, and wherein the control unit is arranged to control the pivot of the user compartment around the vertical axis of the vehicle to point more inwards in a turn than the driving platform following the turn;
   wherein the method comprises:
   pivoting the user compartment in relation to the driving platform around the vertical axis of the vehicle when the vehicle is turning; and
   controlling the pivot of the user compartment around the vertical axis of the vehicle to point more inwards in the turn than the driving platform following the turn.

10. The method of claim 9, further comprising the step of: receiving, in a control unit, input of that the vehicle is turning, and controlling the pivoting of the user compartment in relation to the driving platform around the vertical axis of the vehicle in response to the input.

11. A method of claim 9, further comprising:
    controlling the motor, by the control unit, to pivot the user compartment around the vertical axis of the vehicle.

12. A method of claim 9, further comprising:
    receiving, in the control unit, input that the vehicle is turning, and controlling the pivoting of the user compartment in relation to the driving platform around the vertical axis of the vehicle in response to the input; and
    wherein the step of receiving input includes receiving input from at least one of: one or more sensors of the vehicle, a GPS-system or a cloud service.

13. The method according to claim 9, wherein the step of controlling the pivot of the user compartment around the vertical axis of the vehicle is to simulate a drifting or a skidding movement of the vehicle, even if the vehicle is not drifting or skidding.

* * * * *